US009064611B2

(12) United States Patent
Freund et al.

(10) Patent No.: US 9,064,611 B2
(45) Date of Patent: Jun. 23, 2015

(54) 2D COLLIMATOR FOR A RADIATION DETECTOR AND METHOD FOR MANUFACTURING SUCH A 2D COLLIMATOR

(75) Inventors: Andreas Freund, Heroldsbach (DE); Claus Pohan, Baiersdorf (DE); Gottfried Tschöpa, Baiersdorf (DE); Jan Wrege, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/306,108

(22) Filed: Nov. 29, 2011

(65) Prior Publication Data

US 2012/0132834 A1 May 31, 2012

(30) Foreign Application Priority Data

Nov. 30, 2010 (DE) ........................ 10 2010 062 192

(51) Int. Cl.
*G02B 5/00* (2006.01)
*G21K 1/02* (2006.01)

(52) U.S. Cl.
CPC ........... *G21K 1/025* (2013.01); *Y10T 156/1089* (2015.01)

(58) Field of Classification Search
USPC ........................................................ 250/505.1
See application file for complete search history.

(56) References Cited

U.S. PATENT DOCUMENTS

| | | | | |
|---|---|---|---|---|
| 4,419,585 | A * | 12/1983 | Strauss et al. | 250/505.1 |
| 7,196,331 | B2 | 3/2007 | Heismann | |
| 7,242,749 | B2 | 7/2007 | Basu | |
| 7,399,119 | B2 | 7/2008 | Dunham | |
| 7,728,298 | B2 | 6/2010 | Heismann | |
| 2003/0072415 | A1 * | 4/2003 | Eidam et al. | 378/154 |
| 2005/0161608 | A1 | 7/2005 | Heismann | |
| 2006/0055087 | A1 | 3/2006 | Freund et al. | |
| 2006/0097204 | A1 * | 5/2006 | Yanagisawa et al. | 250/505.1 |
| 2006/0124856 | A1 | 6/2006 | Heismann | |
| 2007/0064878 | A1 | 3/2007 | Heismann | |
| 2007/0152159 | A1 * | 7/2007 | Short et al. | 250/363.1 |
| 2008/0268199 | A1 * | 10/2008 | Eriksson | 428/99 |

(Continued)

FOREIGN PATENT DOCUMENTS

| | | |
|---|---|---|
| CN | 1409326 A | 4/2003 |
| CN | 1707699 A | 12/2005 |

(Continued)

OTHER PUBLICATIONS

Certified German Priority document for German Application No. DE 10 2010 062 192.7 filed Nov. 30, 2010 (Not Yet Published).

(Continued)

*Primary Examiner* — Nicole Ippolito
*Assistant Examiner* — Jason McCormack
(74) *Attorney, Agent, or Firm* — Harness, Dickey & Pierce

(57) ABSTRACT

A 2D collimator is disclosed for a radiation detector. In at least one embodiment, the 2D collimator includes 2D collimator modules arranged in series, wherein adjacent 2D collimator modules are glued together to establish a fixed mechanical connection to facing module sides, and wherein, on their free-remaining side, the outer 2D collimator modules have a retaining element for mounting the 2D collimator opposite a detector mechanism. A method for manufacturing such a 2D collimator is also disclosed.

12 Claims, 3 Drawing Sheets

(56) References Cited

U.S. PATENT DOCUMENTS

| | | | | |
|---|---|---|---|---|
| 2009/0039562 | A1 | 2/2009 | Freund et al. | |
| 2010/0014633 | A1* | 1/2010 | Pohan | 378/21 |
| 2010/0232567 | A1* | 9/2010 | Yaoi | 378/19 |
| 2011/0096895 | A1* | 4/2011 | Kurochi | 378/19 |
| 2012/0056095 | A1* | 3/2012 | Metzler et al. | 250/363.1 |
| 2012/0085942 | A1* | 4/2012 | Birman et al. | 250/505.1 |

FOREIGN PATENT DOCUMENTS

| | | | |
|---|---|---|---|
| CN | 1791944 | A | 6/2006 |
| DE | 102004001688 | A1 | 8/2005 |
| DE | 102004057533 | A1 | 6/2006 |
| DE | 102005044650 | A1 | 3/2007 |
| DE | 102007051306 | A1 | 4/2009 |
| DE | 102004027158 | B4 | 7/2010 |
| WO | WO 2004107355 | A1 | 12/2004 |
| WO | WO 2010007544 | A1 | 1/2010 |

OTHER PUBLICATIONS

German Office Action for German Application No. DE 10 2010 062 192.7 dated Jun. 10, 2011.

* cited by examiner

2D COLLIMATOR FOR A RADIATION DETECTOR AND METHOD FOR MANUFACTURING SUCH A 2D COLLIMATOR

PRIORITY STATEMENT

The present application hereby claims priority under 35 U.S.C. §119 on German patent application number DE 10 2010 062 192.7 filed Nov. 30, 2010, the entire contents of which are hereby incorporated herein by reference.

FIELD

At least one embodiment of the invention generally relates to a 2D collimator for a radiation detector and/or a method for manufacturing a 2D collimator of this kind.

BACKGROUND

Scattered radiation is basically caused by the interaction between the object of interest and primary radiation emanating from the focus of a radiation source. Because of this interaction, it is incident on a radiation converter of a radiation detector from a different spatial direction from that of the primary radiation and causes artifacts in the reconstructed image.

To reduce the detected scatter component in the detector signals, the radiation converters are therefore preceded by collimators. Such collimators have absorber elements whose surfaces are aligned radially to the focus of a radiation source in a fan-like manner so that only radiation from a spatial direction in line with the focus can be incident on the radiation detector.

Even a slight tilt or incorrect positioning of the collimator relative to a radiation converter can cause shadowing of the active regions of the radiation converter, resulting in distortion, i.e. a reduction in the achievable signal-to-noise ratio. A particular challenge for designing a radiation detector is therefore to produce a collimator of very high mechanical strength so that positioning accuracies to within a few μm can be maintained.

These stability requirements are particularly important when the collimator is used in a CT scanner, due to the centrifugal forces acting on the collimators during rotation. In addition, the radiation detectors increasingly have a higher z-coverage in order to enlarge the scan field of view. This increases the width to be spanned by the collimators in the z-direction, thereby increasing the risk of collimator instability.

Due to the enlargement of the radiation detector in the z-direction and in the case of dual-source systems in which two source/detector systems disposed in one scanning plane and offset by a fixed angle in the $\phi$-direction are operated simultaneously to obtain projections, not only scatter suppression along the $\phi$-direction is required but also collimation in the z-direction. Collimators which suppress scatter in one spatial direction only, usually in the $\phi$-direction, are termed one-dimensional (1D) collimators. Collimators producing a collimating effect in two spatial directions are accordingly known as two-dimensional (2D) collimators.

To meet the stability requirements for a 1D collimator, in the known case as described in the publication DE 10 2007 051 306 A1, absorber elements aligned along a z-direction are segmented and mounted in a housing. Segmentation of the absorber elements is performed with the aim of reducing the manufacturing costs while at the same time meeting tighter engineering tolerances. The mechanical stability of the 1D collimator is provided by using a housing in which the plate-shaped absorber elements are precisely aligned and mounted. As a supporting structure, the housing comprises two bridge-like frame sections which are mechanically fixed by a plug-in connection. Housing shapes are also disclosed wherein the frame sections run alongside the absorber elements in each case.

However, the disadvantage of both types of housing is that the frame sections are in the beam path of X-ray radiation to be detected. Due to the nature of their material, the frame sections cannot be completely transparent to X-ray radiation, which means that providing mechanical stability via the housing involves unwanted attenuation of the X-ray radiation and additional scatter generation. This disadvantage is particularly apparent in the case of bridge-shaped housings where the edges of the absorber elements are spanned by the frame sections in one plane. Circumferential frame sections also have the disadvantage that the absorber elements can only be lined up with pitch discontinuities because of an intervening wall.

A 2D collimator is described, for example, in DE 10 2005 044 650 A1. It has a two-dimensional structure with cellular radiation channels. In the disclosed case, the lamellar absorber elements are interconnected cruciformly in a form-fit manner by corresponding slits in the absorber elements to be connected. 2D collimators are also known which are produced by laser sintering of radiation-absorbing metal powder or by stacking a plurality of cast or injection-molded individual gratings made of tungsten-powder-filled polymers. The 2D collimators are also segmented into individual 2D collimator modules to reduce the manufacturing cost/complexity and narrow the manufacturing tolerances, the segment size usually corresponding to the segment size of the radiation converter's detector tile mounted in a detector module. To construct the 2D collimator and produce a mechanically stable arrangement of the 2D collimator modules, these are glued directly to the respective detector tiles.

However, in the event of a defect, glued-on 2D collimator modules cause warping both of the 2D collimator module and of the detector tiles, as nondestructive removal is generally no longer possible. In addition, the detector tiles are subjected to corresponding centrifugal forces by the glued-on 2D collimator modules during rotation.

SUMMARY

In at least one embodiment of the invention, a 2D collimator for a radiation detector is implemented, the collimator including high mechanical stability, so as to create the preconditions for easy, low-cost maintenance of the radiation detector while at the same time preventing detector signal interference caused by interaction with the 2D collimator.

In at least one embodiment of the invention, a method is specified for producing such a 2D collimator.

In at least one embodiment of the invention, a 2D collimator is disclosed for a radiation detector and a method is disclosed for producing a 2D collimator. Advantageous embodiments of the invention are set forth in the respective subclaims.

In at least one embodiment, the invention is based on the recognition that 2D collimator modules, with their cellular structure of radiation channels constituting radiation detector elements, have a very high intrinsic stability or rather intrinsic rigidity which can be used for constructing a bridge-like 2D collimator without using a supporting structure.

At least one embodiment of the inventive 2D collimator for a radiation detector accordingly comprises 2D collimator modules arranged in series, wherein adjacent 2D collimator modules are glued together to establish a fixed mechanical connection to facing module sides, and wherein the outer 2D collimator modules on the free-remaining module side have a retaining element for mounting the 2D collimator opposite a detector mechanism.

At least one embodiment of the invention is also achieved by an inventive method for producing a 2D collimator having at least above described 2D collimator modules disposed in a collimation direction, said method comprising:

a) providing a plurality of the 2D collimator modules,
b) applying a layer of adhesive to at least one side of the respective 2D collimator module, and
c) inserting the 2D collimator elements in a precision tool at a position provided for the respective 2D collimator module.

BRIEF DESCRIPTION OF THE DRAWINGS

Examples of the invention and other advantageous embodiments of the invention as set forth in the sub-claims are illustrated in the following schematic drawings in which:

Figure 1:
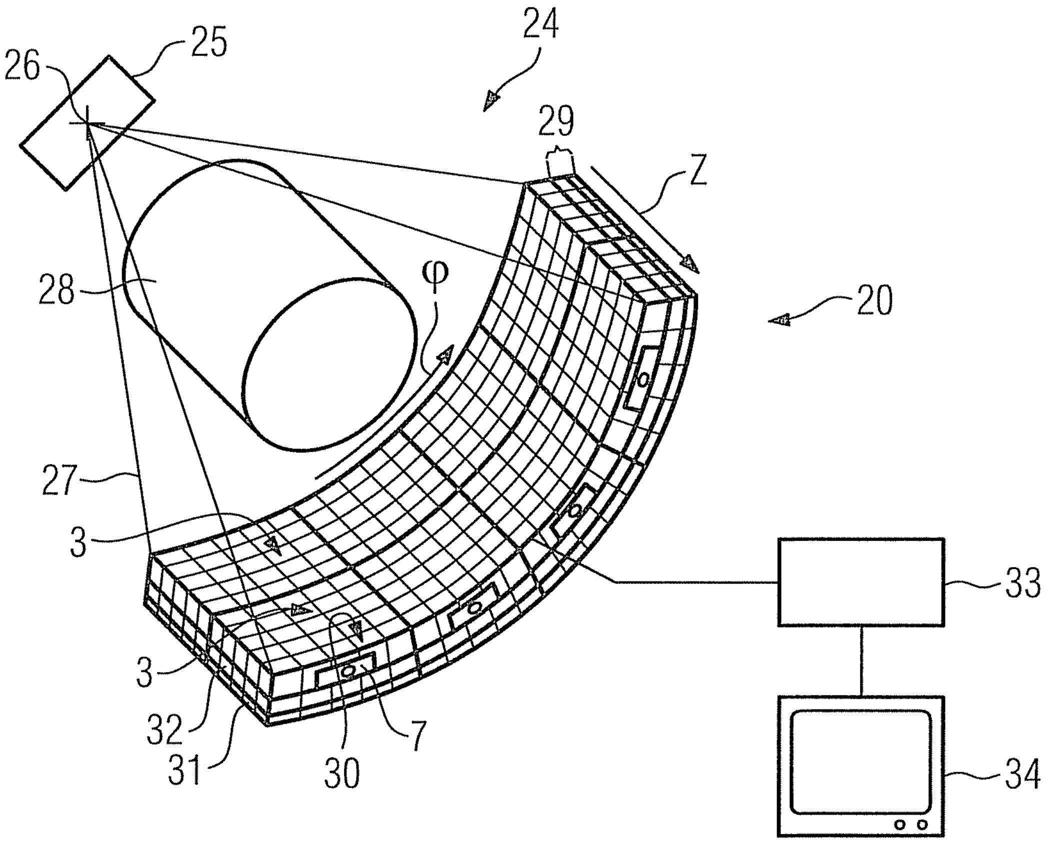
FIG. 1 schematically illustrates a CT scanner.

In the figures, parts producing an identical effect are provided with the same reference characters. In the case of recurring elements in a figure, in some cases only one element is provided with a reference character for reasons of clarity. The representations in the figures are schematic and not necessarily drawn to scale, and the scales may vary between figures.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows the basic structure of a CT scanner 24. The CT scanner 24 comprises a radiation source 25 in the form of an X-ray tube from whose focus 26 an X-ray fan beam 27 emanates. The X-ray fan beam 27 penetrates an object of interest 28, or a patient, and is incident on a radiation detector 20, in this case an X-ray detector.

The radiation source 25 and the radiation detector 20 are disposed opposite one another on a gantry (not shown here) of the CT scanner 24, said gantry being rotatable in a $\phi$-direction about a system axis Z (=patient axis) of the CT scanner. The ϕ-direction therefore represents the circumferential direction of the gantry and the z-direction the longitudinal direction of the object of interest 28.

During operation of the CT scanner 24, the radiation source 25 and the radiation detector 20 disposed on the gantry rotate around the object 28, X-ray images of the object 28 being obtained from different projection directions. For each X-ray projection, the radiation detector 20 is impinged by X-ray radiation which has passed through the object 28 causing it to be attenuated. The radiation converter 29 in turn generates signals corresponding to the intensity of the incident X-ray radiation.

The radiation converter is subdivided into individual detector elements 30 for locally resolved capture of the X-ray radiation. In this concrete example embodiment, signal generation takes place in two stages using a photodiode array 31 which is optically linked to a scintillator array 32. It would likewise be possible to use a directly converting radiation detector based on a semiconductor material. From the signals captured by the radiation detector 20 in this way, a processing unit 33 then calculates in per se known manner one or more two- or three-dimensional images of the object which can be displayed on a display unit 34.

The primary radiation emanating from the focus 26 of the radiation source 25 is scattered in the object 28 (among other things) in different spatial directions. In the detector element 30, this so-called secondary radiation produces signals which cannot be differentiated from the primary radiation signals required for image reconstruction. Unless further action is taken, the secondary radiation would therefore result in misinterpretations of the detected radiation and hence considerable impairment of the images obtained using the CT scanner 24.

Figure 3:
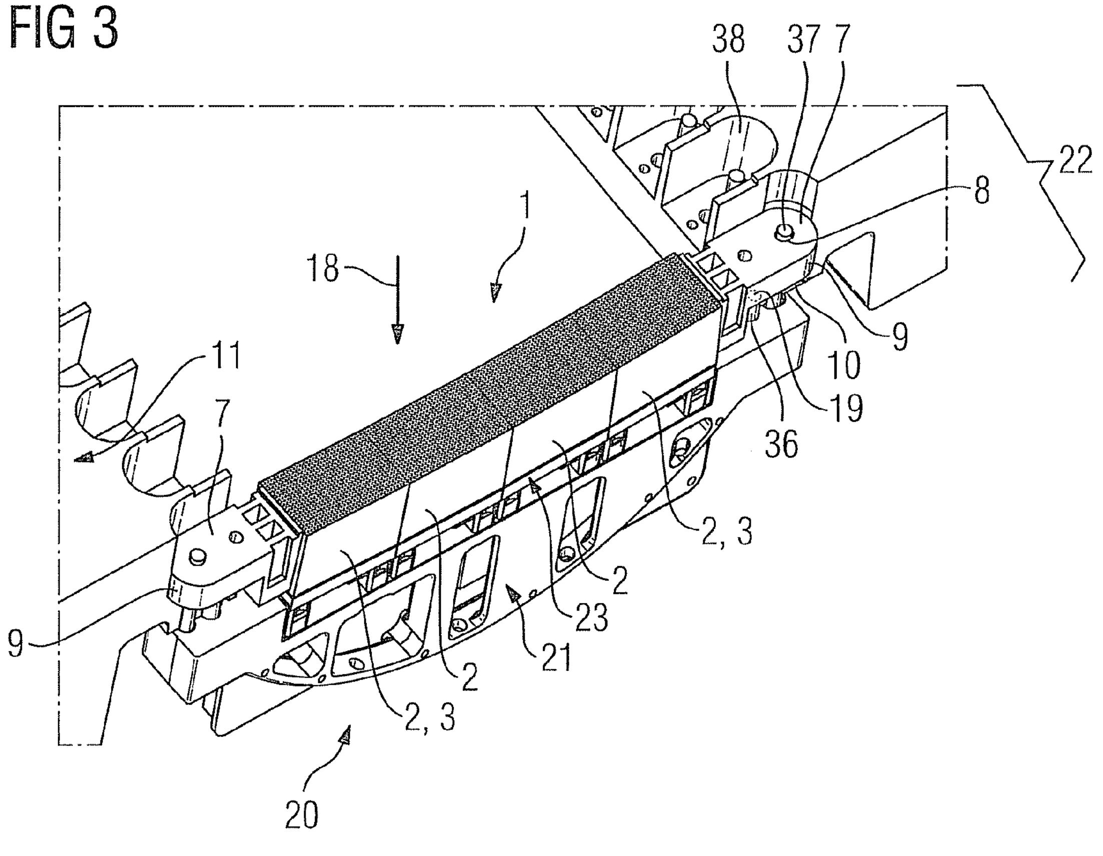
FIG. 3 shows the inventive 2D collimator illustrated in FIG. 2 in the installed state.
Figure 4:
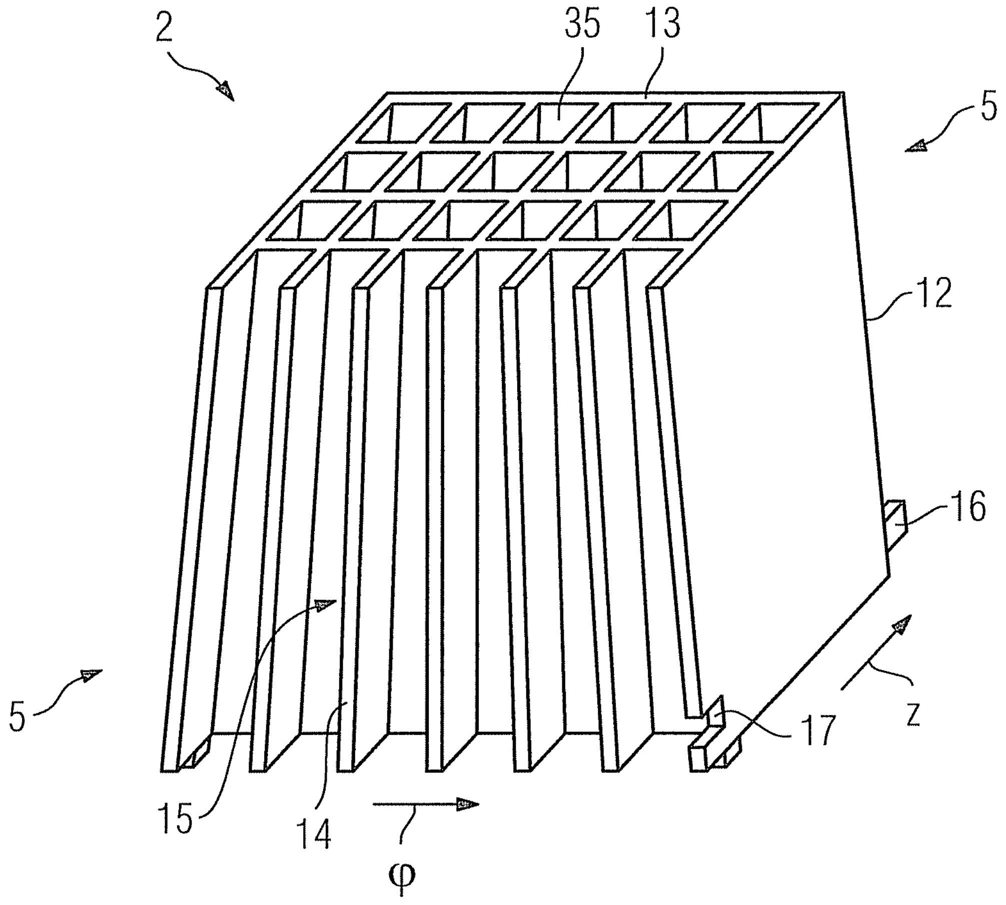
FIG. 4 shows a perspective side view of a 2D collimator module.

In order to limit the effect of the secondary radiation, using 2D collimators 1 according to an embodiment of the invention essentially only the portion of the X-ray radiation emanating from the focus, i.e. the primary radiation component, is allowed to pass unhindered to the radiation converter 20, whereas the secondary radiation is ideally completely absorbed by absorber surfaces of the absorber elements 13, 15 shown in FIG. 4 both in the ϕ-direction and in the z-direction. In FIG. 1 the radiation detector 20 is shown without a visible detector mechanism 11 in which the 2D collimators 1 and the radiation converter 20 are incorporated in a mutually decoupled manner. The design of the radiation detector 20 with the detector mechanism 11 will be explained in greater detail in connection with FIG. 3.

Figure 2:
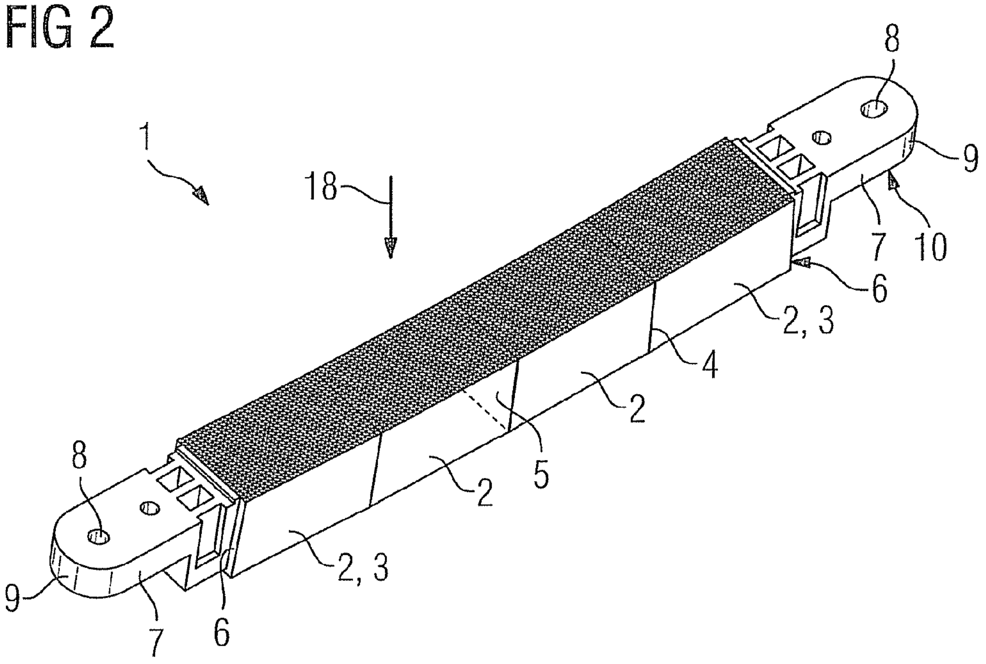
FIG. 2 shows a perspective side view of a freestanding 2D collimator according to an embodiment of the invention.

The 2D collimator 1 according to an embodiment of the invention is shown in FIG. 2 in a perspective view. It comprises a total of four 2D collimator modules 2, 3 arranged is series in the z-direction. The 2D collimator modules 2, 3 are glued together at their respective end face, i.e. module side 5, typically using an epoxy adhesive. Because of the cellular structure and associated high intrinsic rigidity of the 2D collimator modules 2, 3, this glued connection 4 means that, even in the case of large widths to be spanned in the z-direction, the thus constructed 2D collimator 1 possesses a strength which, even during rotation of the CT scanner 24 when rotationally-induced centrifugal forces are applied, results in no interference in the detector signal due to shadowing effects. The intrinsic strength can also be increased still further by using special manufacturing processes. For example, a particularly high intrinsic strength can be achieved if the 2D collimator modules 2, 3 are produced in one piece using what is known as rapid manufacturing. This involves selective laser sintering using radiation-absorbing metal powder, e.g. of tungsten, molybdenum or tantalum.

Facing module sides 5 are of different design as illustrated in FIG. 4 which shows a 2D collimator module 2 by way of example. Thus it would be possible, for example, in the case of adjacent 2D collimator modules 2, for an absorber surface 12 to be glued to edges 14 of absorber elements 15, i.e. connecting pieces, running perpendicularly thereto.

However, facing module sides 5 of adjacent 2D collimator modules 2, 3 can also be of identical construction. The respective module side 5 can be delimited facewise by an absorber element 13 running parallel thereto, so that two absorber surfaces 12 are glued together in each case. Because of the large surfaces, a very firm connection 4 is established between adjacent 2D collimator modules 2, 3. The edge absorber elements 13 which are bonded together can be made smaller than the absorber elements inside the 2D collimator module 2, 3 in order to compensate for the added thickness in the assembled state and can be typically only half as thick as adjacent absorber elements.

Located at the free module sides 6 are angled retaining elements 7 which are attached to the respective module side 6 by a glued connection 4. The 2D collimator 1 is aligned and connected to the detector mechanism 11 via the retaining elements 7. The retaining element 7 comprises corresponding fastening devices 8 and adjustment devices 9, 10. In this example, a drilled hole 8 is used to fasten the 2D collimator 1 to the detector mechanism 11 via a screwed connection. A bearing surface 10 disposed on the underside of the respective retaining element 7 is used to adjust, i.e. align, the 2D collimator 1 in the radiation incidence direction 18. The external contour 9 of the retaining element 7 provides at least one device for adjusting or more specifically aligning the 2D collimator 1 in the z-direction and in the p-direction. Other forms of adjustment or fastening are self-evidently also conceivable.

The 2D collimator 1 can be easily manufactured by a tool in which recesses are provided for precise positioning of the 2D-collimation modules 2, 3. The recesses are implemented such that, by inserting the 2D collimator element 2, 3 corresponding to the recess, alignment is effected such that, in the installed state, the radiation channels 35 are aligned to the focus 26 of the radiation source 25.

FIG. 3 shows a perspective view of a section of the radiation detector 20 with a 2D collimator 1 according to an embodiment of the invention incorporated therein. The radiation detector 20 is subdivided into different detector modules 22, the term detector module 22 being understood as meaning the 2D collimator 1 and radiation converter module 21 as an entity. The radiation converter module 21 is in turn segmented into different detector tiles 23 which are disposed in a row in series along the z-direction.

The 2D collimator 1 spans the entire radiation converter module 21 in the z-direction in a self-supporting manner. Each 2D collimator module 2, 3 is aligned to a specific detector tile 23 of the radiation converter module 21. The 2D collimator 1 is aligned in the radiation incidence direction 18 via the respectively provided bearing surface 10 of the retaining element 7, which bearing surface rests against a supporting surface 19 of precisely dimensioned pins 36. The fastening can be established by way of a screwed connection via the hole 8 drilled in the respective retaining element 7, into which hole a screw 37 disposed on the detector mechanism 11 engages. The external contour 9 of the respective retaining element 7, which contour is used as at least one device of adjustment in the z-direction and in the ϕ-direction, engages in corresponding recesses 38 in the detector mechanism 11. The radiation converter module 21 is incorporated in the detector mechanism 11 in a decoupled manner from the 2D collimator 1, thereby facilitating replacement of the respective component 1, 21.

An embodiment of the inventive 2D collimator for a radiation detector accordingly comprises 2D collimator modules arranged in series, wherein adjacent 2D collimator modules are glued together to establish a fixed mechanical, connection to facing module sides, and wherein the outer 2D collimator modules on the free-remaining module side have a retaining element for mounting the 2D collimator opposite a detector mechanism.

Different spatial arrangements of the 2D collimator elements are conceivable here. In the simplest case, a plurality of 2D collimator modules are arranged one-dimensionally in series in a row in the z-direction. The directions specified in respect of the 2D collimator relate to a normally used coordinate system of the CT scanner for correct use of the 2D collimator in the installed condition.

As the 2D collimator modules are glued directly to one another, no additional supporting structures are required for producing a required rigidity, i.e. mechanical stability, thereby enabling positioning accuracies to within a few micrometers to be maintained during rotation of a CT scanner. In particular, no housing with bridge-like or circumferential frame sections is necessary. As a result, in comparison to the known collimators of bridge-type design, artifacts or disturbances in the detector signals caused by interaction of the incident radiation with the supporting elements are completely eliminated. Glued connections can be implemented with layer thicknesses of a few nanometers, so that the resulting gap between the 2D collimator modules has no measurable negative effect on signal generation. Dispensing with the housing also means that the 2D collimator is less expensive to manufacture because of the lower complexity. In addition, a continuous pitch of the 2D collimator modules disposed in the arc direction, i.e. $\phi$-direction, can be achieved.

The 2D collimator decoupled from the radiation converter is integrated into the radiation detector by way of the retaining elements provided at the edge. There is therefore no fixed mechanical connection between the radiation converter and the 2D collimator, thus making it possible to replace one component without destroying the respective other component. The 2D collimator according to an embodiment of the invention therefore also reduces the maintenance work involved in replacing a component.

The module sides are preferably implemented such that an absorber surface, running parallel to the module side, of an absorber element of one 2D collimator module is glued to edges of perpendicularly thereto running absorber elements of the other 2D collimator module. In this context, an absorber element is to be understood as meaning a plate-like or lamellar basic element with which scattered radiation in respect of a direction running perpendicular to its surface is reduced for a row of detector elements of one detector element side. With this configuration, in particular an unbroken structure running continuously over the collimation direction can be produced in which no dead zones or heavy shadowing occur at seams or joints between adjacent 2D collimator modules.

Alternatively, the sides of the modules are preferably implemented such that absorber surfaces, running parallel to the module side, of an absorber element of the 2D collimator modules are glued together. In this case the contact surface and therefore the achievable strength of the connection between the 2D collimator modules is maximized. To prevent unwanted shadowing of the radiation converter at the interface between the 2D collimator modules, the connecting pieces, i.e. the absorber elements, used to establish a connection can be made half as thick as the absorber elements disposed in the inner region of the 2D collimator module.

In an advantageous embodiment of the invention, for mutually aligning the adjacent 2D collimator modules, at least one projection is disposed on one facing module side, said projection engaging in at least one recess in the corresponding other module side, thereby ensuring simple and at the same time precise mutual alignment of the 2D collimator modules.

The respective retaining element has at least one fastening device for fixing the 2D collimator to a detector mechanism and/or as at least one adjustment device for positioning the 2D collimator in the collimation direction with respect to the detector mechanism, preferably in the form of a drilled hole. At least one device for fastening and/or adjustment can therefore be implemented in a simple and high-precision manner. Adjustment with respect to the detector mechanism would be possible, for example, using at least one alignment device in the form of a guide pin, whereas the position of the 2D collimator module can be simultaneously fixed by a screwed connection when it is in the aligned state.

The respective retaining element preferably has a bearing surface as an adjustment device for positioning the 2D collimator with respect to a detector mechanism in a radiation incidence direction, the bearing surface coming to rest against a support surface of the detector when the 2D collimator is incorporated in a detector mechanism in the radiation incidence direction. Such a bearing surface constitutes a particularly easy to implement at least one adjustment device which can be produced with very tight manufacturing tolerances.

In another advantageous embodiment of the invention, at least the outer 2D collimator modules are manufactured in one piece with the retaining elements. This allows the 2D collimator modules to be produced in a single manufacturing process, reduces the design complexity and increases collimator stability.

The 2D collimator modules are preferably produced in a rapid manufacturing process, preferably by selective laser sintering. Rapid manufacturing is a manufacturing process in which a component is built up layer by layer from powder material using physical and/or chemical effects. In each production step, a new layer can be applied selectively, very precisely and thinly to the existing structure, so that the absorber elements can be produced with great accuracy in terms of their width, height and position. This process is based on layer data which can be easily generated directly from 3D surface data of the kind available in CAD systems.

At least one embodiment of the invention is also achieved by an inventive method for producing a 2D collimator having at least above described 2D collimator modules disposed in a collimation direction, said method comprising:

a) providing a plurality of the 2D collimator modules,
b) applying a layer of adhesive to at least one side of the respective 2D collimator module, and
c) inserting the 2D collimator elements in a precision tool at a position provided for the respective 2D collimator module.

If the outer 2D collimator modules cannot be produced with the retaining elements as a single element, at least one embodiment of the method advantageously comprises:

d) Gluing the retaining elements to the outer 2D collimator modules.

In at least one embodiment, Step a) advantageously also comprises:

a1) Producing the 2D collimator modules using a rapid manufacturing process, preferably by selective laser sintering.

To summarize:

At least one embodiment of the invention relates to a 2D collimator 1 for a radiation detector 20 with 2D collimator modules 2, 3 arranged in series, wherein adjacent 2D collimator modules 2, 3 are glued together to establish a fixed mechanical connection 4 to facing module sides 5, and wherein, on their free-remaining side 6, the outer 2D collimator modules 3 have a retaining element 7 for mounting the 2D collimator 1 opposite a detector mechanism 11. This creates the preconditions for decoupled integration into the radiation detector 20 with respect to the radiation converter module 21 and therefore for low-cost/complexity maintenance of the radiation detector 20 while at the same time preventing detector signal interference caused by the interaction of incident radiation with the 2D collimator 1. At least one embodiment of the invention also relates to method for manufacturing such a 2D collimator 1.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A radiation detector, comprising:

an array of 2D collimators configured to collimate in at least two collimation directions, each of the 2D collimators of the array including 2D collimator modules arranged in series, adjacent ones of the 2D collimator modules being glued together via a layer of adhesive, to establish a fixed mechanical connection to facing module sides of the 2D collimator modules, relatively outer ones of the 2D collimator modules including at least one retaining element on at least one remaining side, the retaining element including a screw mechanism for mounting each of the 2D collimators of the array opposite a detector mechanism, wherein each of the 2D collimators of the array is replaceable independently of the remaining ones of the 2D collimators of the array.

2. The 2D collimator as claimed in claim 1, wherein the facing module sides are implemented such that an absorber surface of an absorber element of one of the 2D collimator modules, running parallel to the module side, is glued to edges of absorber elements of other adjacent ones of the 2D collimator modules.

3. The 2D collimator as claimed in claim 1, wherein the facing module sides are implemented such that absorber surfaces, running parallel to the module sides, of an absorber element of the adjacent 2D collimator modules are glued together.

4. The 2D collimator as claimed in claim 1, wherein, for mutual alignment of the adjacent 2D collimator modules, there is provided on one facing module side, at least one projection to engage in at least one recess in the corresponding other module side.

5. The 2D collimator as claimed in claim 1, wherein the at least one retaining element includes, at least one fastening device to fasten the respective 2D collimator to the detector mechanism; and at least one adjustment device to position the 2D collimator in the collimation direction with respect to the detector mechanism.

6. The 2D collimator as claimed in claim 5, wherein the at least one adjustment device for positioning the 2D collimator with respect to the detector mechanism in a radiation incidence direction includes a bearing surface which, when the 2D collimator is incorporated in the detector mechanism in the radiation incidence direction, comes to rest against a support surface of the detector mechanism.

7. The 2D collimator as claimed in claim 1, wherein at least the outer 2D collimator modules are manufactured in one piece with the at least one retaining element.

8. The 2D collimator as claimed in claim 7, wherein the 2D collimator modules are produced using selective laser sintering.

9. A method for manufacturing an array of 2D collimators collimating in at least two collimation directions with 2D collimator modules disposed in at least one collimation direction of each of the 2D collimators, the method comprising:

preparing a plurality of 2D collimator modules;

applying a layer of adhesive to at least one module side of adjacent ones of the 2D collimator modules;

forming each of the 2D collimators of the array from a given number of the plurality of 2D modules, each of the 2D collimators of the array being replaceable independently of the remaining ones of the 2D collimators of the array;

mounting each of the 2D collimators opposite a detector mechanism via at least one retaining element including a screw mechanism; and placing the 2D collimators in a precision tool at a position provided for respective 2D collimator modules.

10. The method as claimed in claim 9, further comprising:

gluing the at least one retaining element to at least one free side of relatively outer ones of the 2D collimator modules.

11. The method as claimed in claim 9, wherein the preparing includes producing the 2D collimator modules using selective laser sintering.

12. A radiation detector, comprising:

an array of 2D collimators, the 2D collimators of the array comprising 2D collimator modules arranged in series, adjacent ones of the 2D collimator modules being glued together to establish a fixed mechanical connection to facing module sides of the 2D collimator modules, relatively outer ones of the 2D collimator modules including at least one retaining element on at least one remaining side, the retaining element including a screw mechanism for mounting each of the 2D collimators of the array opposite a detector mechanism, wherein each of the 2D collimators of the array is replaceable independently of the remaining ones of the 2D collimators of the array, and each of outer ones of the 2D collimators being formed as one piece and including one 2D collimator module.

* * * * *